(12) United States Patent
Dudar et al.

(10) Patent No.: US 10,011,181 B2
(45) Date of Patent: Jul. 3, 2018

(54) VEHICLE-TO-VEHICLE CHARGING SYSTEM

(71) Applicant: Ford Global Technologies, LLC, Dearborn, MI (US)

(72) Inventors: Aed M. Dudar, Canton, MI (US); Mahmoud Yousef Ghannam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 22 days.

(21) Appl. No.: 15/277,469

(22) Filed: Sep. 27, 2016

(65) Prior Publication Data
US 2018/0086212 A1    Mar. 29, 2018

(51) Int. Cl.
| | |
|---|---|
| *H02J 7/00* | (2006.01) |
| *B60L 11/18* | (2006.01) |
| *G07C 5/08* | (2006.01) |
| *H01F 38/14* | (2006.01) |
| *H04B 5/00* | (2006.01) |

(52) U.S. Cl.
CPC .......... *B60L 11/182* (2013.01); *G07C 5/0816* (2013.01); *H01F 38/14* (2013.01); *H04B 5/0037* (2013.01)

(58) Field of Classification Search
CPC .... B60L 5/005; B60L 11/182; B60L 11/1809; B60L 11/1829
USPC ....................................................... 320/108
See application file for complete search history.

(56) References Cited

U.S. PATENT DOCUMENTS

| | | |
|---|---|---|
| 7,246,774 B2 | 7/2007 | Von Thal et al. |
| 7,275,718 B2 | 10/2007 | Saggio, III et al. |
| 8,368,348 B2 | 2/2013 | Reddy |
| 9,407,105 B2 | 8/2016 | Hyde et al. |
| 9,566,868 B2 | 2/2017 | Jammer |
| 2002/0096412 A1 | 7/2002 | Batisse |
| 2010/0121509 A1 | 5/2010 | Takeshima et al. |
| 2012/0193153 A1 | 8/2012 | Wellborn et al. |
| 2013/0248311 A1 | 9/2013 | Czainski et al. |
| 2014/0306063 A1 | 10/2014 | Kusnitz |
| 2015/0336677 A1 | 11/2015 | Smaoui et al. |

(Continued)

FOREIGN PATENT DOCUMENTS

| | | |
|---|---|---|
| CN | 104249736 A1 | 12/2014 |
| DE | 4115568 A1 | 2/1993 |

(Continued)

OTHER PUBLICATIONS

Maglaras et al., "Dynamic wireless charging of electric vehicles on the move with Mobile Energy Disseminators", (IJACSA) International Journal of Advanced Computer Science and Applicants, vol. 6, No. 6, 2015, www.ijacsa.thesai.org, pp. 239-251.

(Continued)

*Primary Examiner* — Paul Dinh
(74) *Attorney, Agent, or Firm* — Frank A. MacKenzie; Bejin Bieneman PLC (57) ABSTRACT

A vehicle charging system includes an electrical storage device, an extendable arm attachable to a vehicle, and an induction mat supported by the extendable arm. The induction mat is electrically coupled to the electrical storage device, and configured to wirelessly receive an electric charge while the extendable arm is in an extended position.

20 Claims, 5 Drawing Sheets

(56) References Cited

U.S. PATENT DOCUMENTS

| | | |
|---|---|---|
| 2016/0052404 A1 | 2/2016 | Enomoto |
| 2016/0129793 A1 | 5/2016 | Cronie |
| 2016/0303986 A1 | 10/2016 | Park et al. |
| 2017/0136881 A1* | 5/2017 | Ricci ..................... B60L 5/005 |
| 2017/0225682 A1 | 8/2017 | Schunk et al. |

FOREIGN PATENT DOCUMENTS

| | | |
|---|---|---|
| DE | 102012214750 A1 | 11/2013 |
| JP | 201370514 A | 4/2013 |
| WO | 2016156383 A1 | 10/2016 |
| WO | 2017044023 A1 | 3/2017 |
| WO | 2017059893 A1 | 4/2017 |
| WO | 2017209735 A1 | 12/2017 |

OTHER PUBLICATIONS

UK Search Report dated Mar. 15, 2018 re GB Appl. No. 1715181.2.

* cited by examiner

VEHICLE-TO-VEHICLE CHARGING SYSTEM

BACKGROUND

Electric vehicles provide an alternative to gas-fueled vehicles. Electric vehicles may be powered with electricity that is stored on board the vehicle using, e.g., a battery. An external power source may transmit the stored electricity to the battery.

DETAILED DESCRIPTION

With reference to the Figures, wherein like numerals indicate like parts throughout the several views, an autonomous electric vehicle, such as host vehicle 10, includes a vehicle charging system 12. The vehicle charging system 12 includes an electrical storage device 14, an extendable arm 16, and a wireless electric transfer device 22, such as an induction mat 24.

Figure 1:
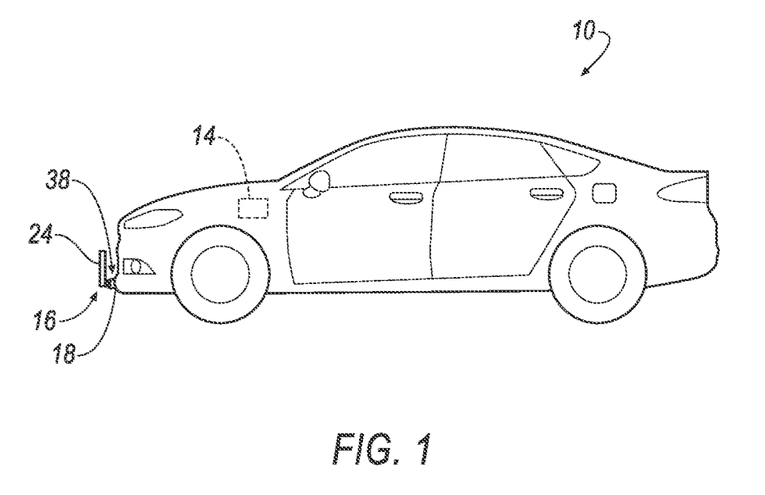
FIG. 1 illustrates an example autonomous electric vehicle with a vehicle charging system, including an extendable arm and an induction mat supported by the extendable arm, with the extendable arm in an unextended position.
Figure 2:
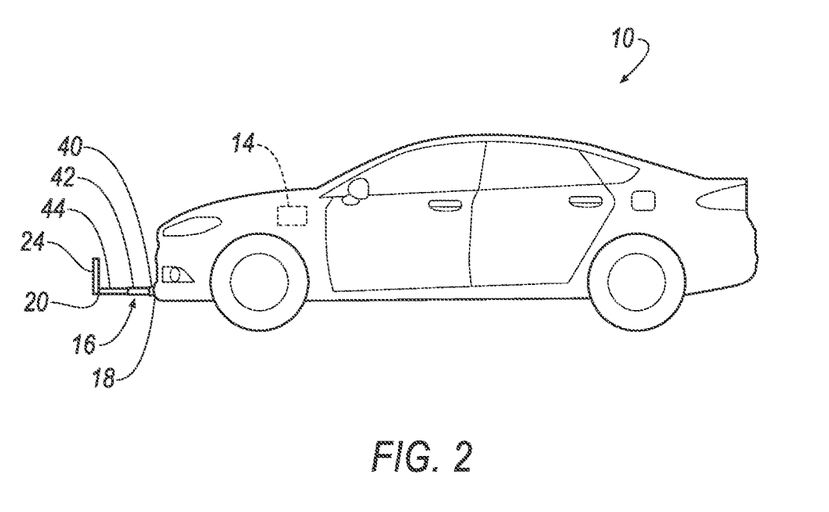
FIG. 2 illustrates the autonomous electric vehicle of FIG. 1, with the extendable arm in the extended position.
Figure 3:
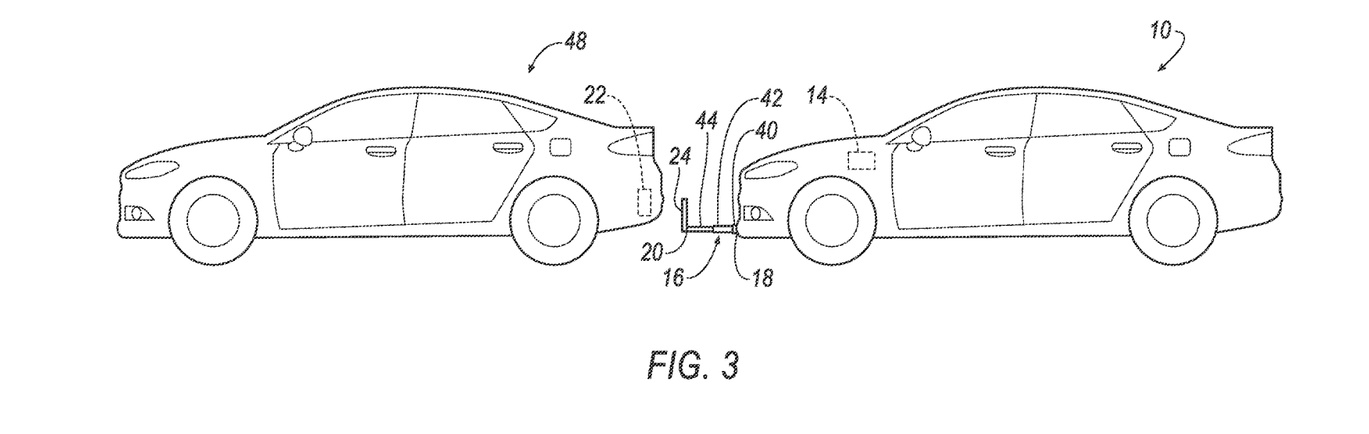
FIG. 3 illustrates the autonomous electric vehicle of FIG. 2 receiving an electric charge from a wireless electric transfer device of another vehicle while moving.

The extendable arm 16 includes a first end 18 and a second end 20. As shown in FIGS. 1-3, the first end 18 of the extendable arm 16 can be attached to a front end of the host vehicle 10. The second end 20 of the extendable arm 16 supports the induction mat 24. The second end 20 is extendable (e.g., telescoping) from the first end 18 to an extended position in a direction away from the host vehicle 10. When the extendable arm 16 is attached to the front end of the host vehicle 10 and in the extended position, the second end 20 and the induction mat 24 can be extended in a direction forward of the host vehicle 10.

Figure 4:
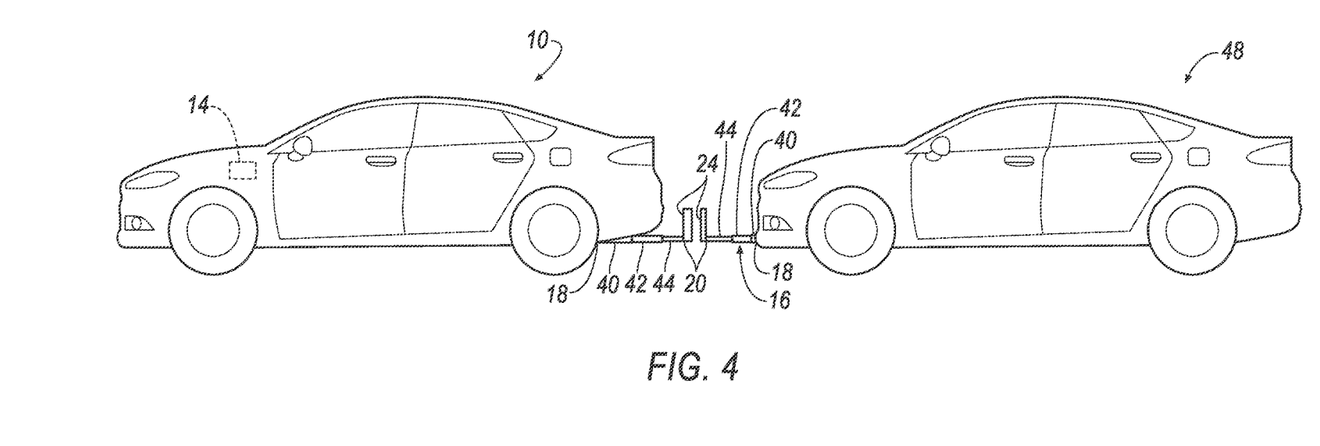
FIG. 4 illustrates the autonomous vehicle of FIG. 2 transmitting an electric charge to another vehicle while moving, with the other vehicle including an extendable arm and an induction mat.

As shown in FIG. 4, the extendable arm 16 may also be attached to a rear end of the host vehicle 10. When the extendable arm 16 is attached to the rear end of the host vehicle 10 and in the extended position, the second end 20 and the induction mat 24 can be extended in a direction rearward of the host vehicle 10.

The host vehicle 10 may include more than one extendable arm 16 and induction mat 24. For example, one extendable arm 16 supporting an induction mat 24 can be attached to the front end of the host vehicle 10, and another extendable arm 16 supporting another induction mat 24 can be attached to the rear end of the host vehicle 10. The extendable arm 16 can be attached at other locations of the host vehicle 10 in addition to the front end and the rear end.

The wireless electric transfer device 22, e.g., the induction mat 24, is implemented via electronic components that wirelessly transmit and receive an electric field to generate an electric charge, including when the host vehicle 10 is moving and the extendable arm 16 is in the extended position. The induction mat 24 may transmit/receive the electric field using inductive coupling, magnetic resonance coupling, and/or other wireless electric transfer techniques, or combinations thereof.

For example, the induction mat 24 may include an induction coil 26 supported by the induction mat 24 for transmitting and receiving the electric field and generating an electric charge in accordance with the electric field. The induction mat 24 is electrically coupled to the electrical storage device 14 and provides the electric charge to the electrical storage device 14.

Figure 6A:
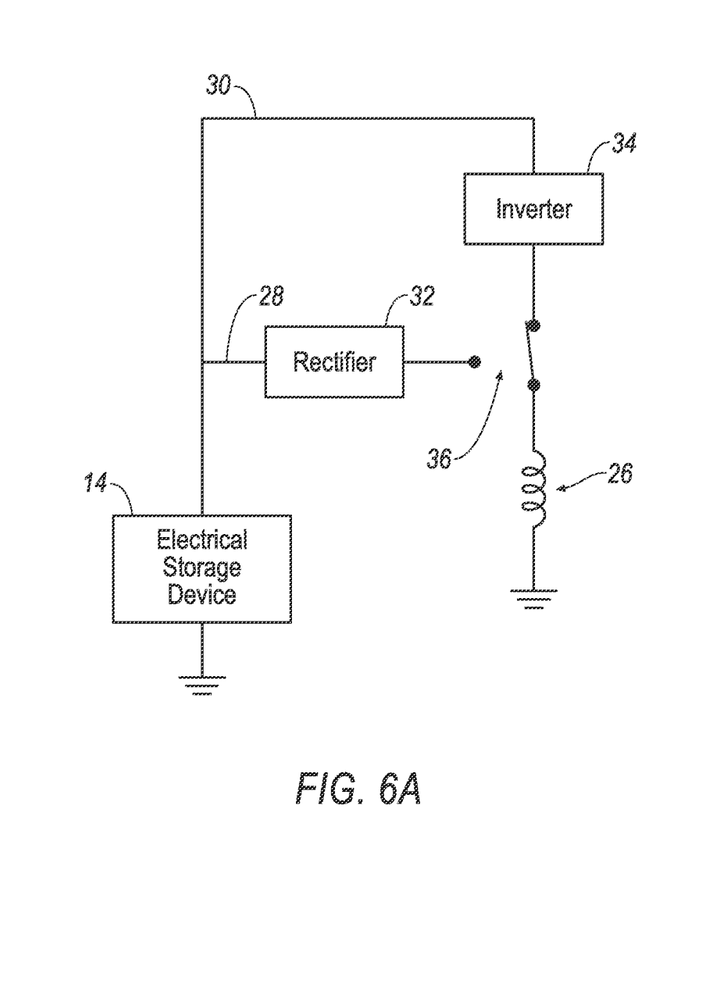
FIG. 6A is a circuit diagram when the host vehicle is receiving an electric charge.
Figure 6B:
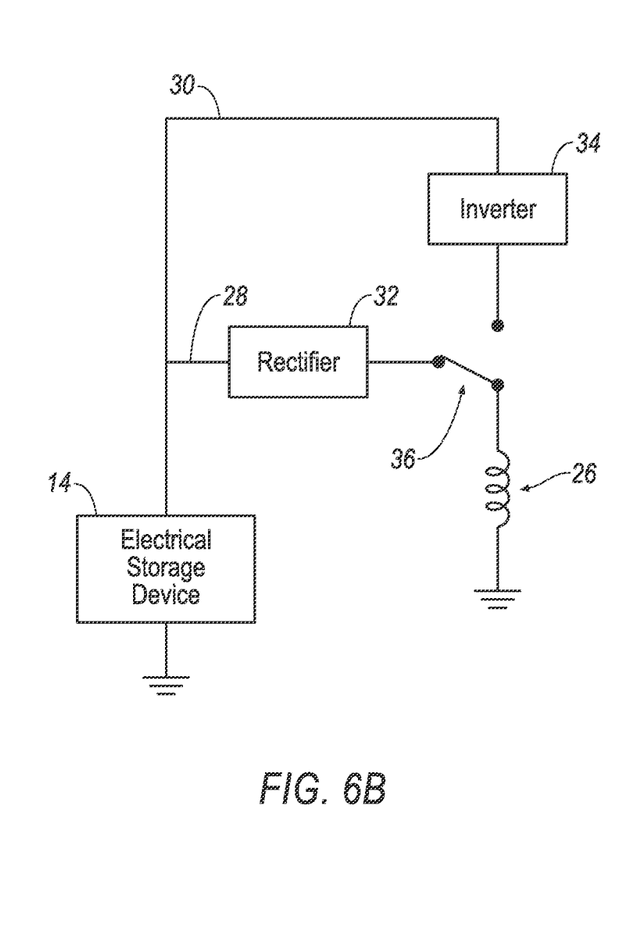
FIG. 6B is a circuit diagram when the host vehicle is transmitting an electric charge.

As shown in FIGS. 6A and 6B, a first electric lead 28 and a second electric lead 30 electrically connect the electrical storage device 14 to the induction coil 26 via a switch 36. When the switch 36 connects to the first electric lead 28, the electric charge generated by the induction coil 26 is provided to a rectifier 32 between the electrical storage device 14 and the switch 36. The electric charge generated by the induction coil 26 may be in the form of an alternating current. The rectifier 32 may convert the electric charge to a direct current that can be used to charge the electrical storage device 14. Thus, when the switch 36 is in a first position, i.e., electrically connecting the first electric lead 28 to the induction coil 26, the electric charge can be transferred from the induction mat 24 to the electrical storage device 14 when the induction mat 24 is receiving the electric charge from, for example, another vehicle.

The second electric lead 30 can include an inverter 34 between the electrical storage device 14 and the switch 36. When the switch 36 connects to the second electric lead 30, the electric charge from the electrical storage device 14 is provided to the inverter 34. The electric charge from the electrical storage device 14 may be in the form of a direct current. The inverter 34 may convert the electric charge to an alternating current that can by used by the induction coil 26 to transmit an electric field. Thus, when the switch 36 is in a second position, i.e., electrically connecting the second electric lead 30 to the induction coil 26, the electric charge can be transferred from the electrical storage device 14 to the induction mat 24 when the induction mat 24 is transmitting the electric charge to, for example, another vehicle.

Referring to FIG. 1, the host vehicle 10 includes the electrical storage device 14, the extendable arm 16 and the induction mat 24. The induction mat 24 supports the induction coil 26. The extendable arm 16 is shown in an unextended position.

As shown in FIG. 2, the first end 18 of the extendable arm 16 is attached to the host vehicle 10 at the front end of the host vehicle 10. The extendable arm 16 is shown in the extended position. The first end 18 of the extendable arm 16 can be attached to the host vehicle 10 in any suitable manner, such as by welding, with fasteners, etc.

The second end 20 of the extendable arm 16 supports the induction mat 24, as shown in FIGS. 1-4. For example, the induction mat 24 can be attached to the second end 20 of the extendable arm 16 via fasteners, adhesives, and the like.

The extendable arm 16 may be formed from a plurality of concentric tubes 38, with the tubes configured to telescope to the extended position. For example, a first tube 40 may be directly attached to the host vehicle 10. A second tube 42 having a smaller diameter than the first tube 40 may slidably fit within the first tube 40. A third tube 44 supporting the induction mat 24, and having a smaller diameter than the second tube 42, may slidably fit within the second tube 42. The extendable arm 16 is rigid, and may be formed of plastic, metal, or other suitable materials.

Thus, when the extendable arm 16 is in the extended position, the second and third tubes 42, 44 may slide out from the first tube 40 and the second tube 42, respectively, making the overall length of the extendable arm 16 greater than when the extendable arm 16 is in the unextended position. The second and third tubes 42, 44 may also retract into the first tube 40 and the second tube 42, respectively, when the extendable arm 16 is in the unextended position, making the overall length of the extendable arm 16 shorter than when the extendable arm 16 is in the extended position.

While the above-described extendable arm 16 includes three tubes, the plurality of concentric tubes 38 can include more or fewer tubes. Alternatively, the extendable arm 16 can be formed from other components configured to allow the extendable arm 16 to extend to the extended position and retract to the unextended position, such as folding mechanical linkages. An actuator 46 may be configured to extend and retract the extendable arm 16 using hydraulics, pneumatics, etc.

FIG. 3 shows the first end 18 of the extendable arm 16 attached to the front of the host vehicle 10, with the extendable arm 16 in the extended position. FIG. 3 further illustrates a target vehicle 48. The target vehicle 48 includes the wireless electric transfer device 22. The wireless electric transfer device 22 of the target vehicle 48 can be configured to transmit the electric field to the host vehicle 10, or to receive the electric field from the host vehicle 10, including when the target vehicle 48 and the host vehicle 10 are moving.

As shown in FIG. 4, the extendable arm 16 of the host vehicle 10 can be attached to the rear end of the host vehicle 10. FIG. 4 further illustrates the target vehicle 48 including an extendable arm 16 supporting an induction mat 24. The extendable arms 16 of both the host vehicle 10 and the target vehicle 48 are shown in the extended position. In this instance, the host vehicle 10 is transmitting the electric field to the target vehicle 48. Alternatively, the target vehicle 48 may be transmitting the electric field to the host vehicle 10. In either case, the transmission and receipt of the electric field can occur while the host vehicle 10 and the target vehicle 48 are moving.

While the host vehicle 10 and the target vehicle 48 as illustrated in FIGS. 3 and 4 are a similar size and type, it is to be understood that the host vehicle 10 and the target vehicle 48 may be of different sizes and types. For example, the host vehicle 10 may include any passenger or commercial automobile such as a car, a truck, a sport utility vehicle, a crossover vehicle, a van, a minivan, a taxi, a bus, etc., as discussed below. Similarly, the target vehicle 48 may include any passenger or commercial automobile such as a car, a truck, a sport utility vehicle, a crossover vehicle, a van, a minivan, a taxi, a bus, etc.

As discussed above, the host vehicle 10 can be an autonomous vehicle. The host vehicle 10 may operate in an autonomous mode, a partially autonomous mode, and/or a non-autonomous mode. When operating in the autonomous mode, the host vehicle 10 at least partially controls various vehicle subsystems associated with controlling steering, braking, and accelerating. When operating in a non-autonomous mode, a vehicle driver may handle the steering, braking, and accelerating via driver inputs provided to, e.g., a steering wheel, a brake pedal, and an accelerator pedal, respectively.

Although illustrated in the Figures as a sedan, as discussed above, the host vehicle 10 may include any passenger or commercial automobile such as a car, a truck, a sport utility vehicle, a crossover vehicle, a van, a minivan, a taxi, a bus, etc.

Figure 5:
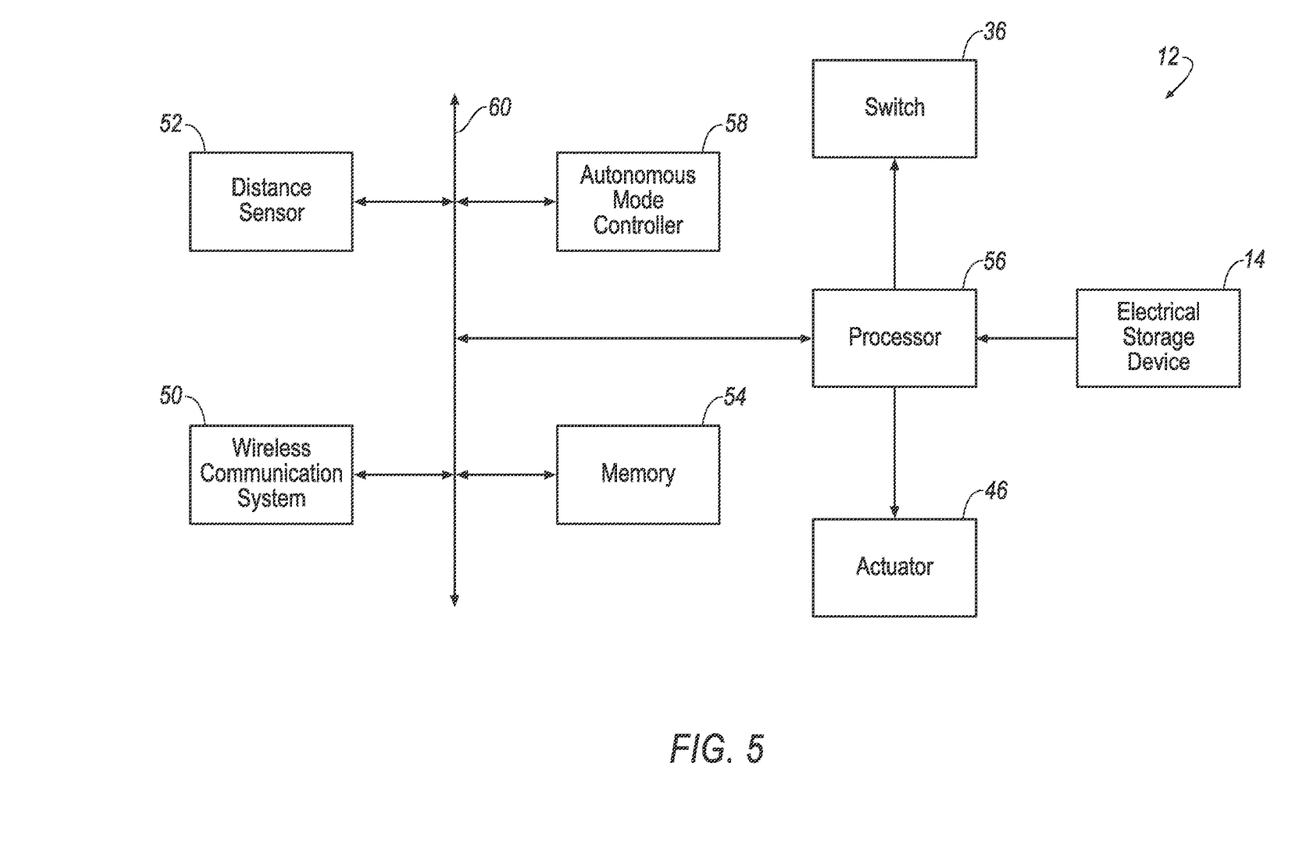
FIG. 5 is a block diagram showing example components of the vehicle charging system.

Referring to FIG. 5, the vehicle charging system 12 may include or work in cooperation with the electrical storage device 14, a wireless communications system 50, one or more sensors, such as a distance sensor 52, the switch 36, the actuator 46, a memory 54, a processor 56, and an autonomous mode controller 58. Alternatively, the vehicle charging system 12 may include a subset of these components, or may include additional components.

The electrical storage device 14 can include a battery. The battery may be of any suitable type for vehicular electrification, such as lithium-ion batteries, nickel-metal hydride batteries, or lead-acid batteries. The battery can be a battery for powering the motor of the host vehicle 10, and/or a battery for powering accessories for the host vehicle 10, such as lights, radio, climate controls systems, etc. Alternatively, the electrical storage device 14 can be one or more ultracapacitors. The electrical storage device 14 is configured to store the electric charge used to power the host vehicle 10, as discussed above.

The wireless communications system 50 can support wireless communications by the host vehicle 10, such as dedicated short-range communications (DSRC), to allow the host vehicle 10 to communicate with other vehicles. In addition, the wireless communications system 50 may also communicate with infrastructure, such as traffic signs, traffic lights, etc. Example components of the wireless communications system 50 can include a transceiver. The transceiver generally includes a processor, radio circuitry, an output amplifier, an input pre-amplifier, and a switch to toggle the transceiver between a transmit mode and a receive mode. The transceiver may also include and/or be connected to an antenna.

The distance sensor 52, e.g., ultrasonic sensors, lidar, radar, cameras, etc., is implemented via chips, circuits, or other electrical components to detect a distance. The distance sensor 52 can be located, for example, on the host vehicle 10, the extendable arm 16, and the induction mat 24. Distances detected by the distance sensor 52 can include the distance between the host vehicle 10 and other vehicles, such as the target vehicle 48, the distance between the extendable arm 16 of the host vehicle 10 and the target vehicle 48, the distance between the induction mat 24 of the host vehicle 10 and the target vehicle 48, the distance between the induction mat 24 of the host vehicle 10 and the wireless electric transfer device 22 of the target vehicle 48, etc. The distance sensor 52 can be programmed to output a distance detection signal when one or more predetermined distances are detected, including those described above, to the autonomous mode controller 58.

The memory 54 of the vehicle charging system 12 is implemented via chips, circuits, or other electronic components that can store electronic data. The memory 54 may store, for example, various computer-executable instructions, including instructions that can be executed by the processor 56. Thus, the memory 54 may make such instructions available to the processor 56 and possibly other components of the host vehicle 10. In addition, the memory 54 may store other data, such as the make/model of the host vehicle 10, the host vehicle's 10 speed and direction, as well as information from the target vehicle 48, etc. The memory 54 for storing instructions may be different than a memory for storing other forms of data.

FIG. 5 shows the memory 54 as a separate component of the vehicle charging system 12. As discussed below, however, the autonomous mode controller 58 can also include memory. The memory in the autonomous mode controller 58, and/or in any other component in the vehicle charging system 12 that includes memory, may be used for the vehicle charging system 12 as an alternative to or in addition to the memory 54. In some instances, the memory 54 may be incorporated into the processor 56.

The processor 56 is implemented via chips, circuits, or other electronic components programmed to access and execute the computer-executable instructions stored in the memory 54, and/or the memory in any other component in the vehicle charging system 12, such as the memory of the autonomous mode controller 58. In some possible approaches, the processor 56 also serves as the autonomous mode controller 58, or vice versa.

The autonomous mode controller 58 may control all or some operations of the host vehicle 10 when the host vehicle 10 is operating in the autonomous mode, e.g., steering, accelerating, braking, etc. The autonomous mode controller 58 is a computing device that generally includes a processor and a memory, the memory including one or more forms of computer-readable media, and storing instructions executable by the processor for performing the various operations. The memory of the autonomous mode controller 58 further generally stores remote data received via various communications mechanisms; e.g., the autonomous mode controller 58 can communicate over a communication network 60 as shown in FIG. 5, such as a controller area network (CAN) bus and/or other wired or wireless protocols, e.g., Ethernet, Bluetooth®, Bluetooth® Low Energy, etc. In this way, the autonomous mode controller 58 may transmit messages to various components in the host vehicle 10.

The processor 56 can be programmed to monitor a charge level of the electrical storage device 14 (e.g., a battery state of charge). The processor 56 can be programmed to determine that a charge level of the host vehicle 10 is low (e.g., below a predetermined threshold) in the event the electric charge stored in the electrical storage device 14 is insufficient, for example, to allow the host vehicle 10 to reach a destination. If the processor 56 determines that the charge level of the host vehicle 10 is low, the processor 56 can be programmed to output a notification signal to the wireless communications system 50.

The wireless communications system 50 can be programmed to receive the notification signal from the processor 56 indicating that the charge level of the host vehicle 10 is low. In response to the notification signal, the wireless communications system 50 can be programmed to send communications to other vehicles. The communications can identify, for example, a present location of the host vehicle 10, a direction in which the host vehicle 10 is traveling, a current speed of the host vehicle 10, a charge level of the host vehicle, etc., and request, via the wireless communications system 50, that the other vehicles provide an electric charge to the host vehicle 10.

One or more vehicles may receive the communication broadcast from the host vehicle 10. In response to the communication, a responding vehicle may send a communication back to the host vehicle 10. In addition to indicating that the responding vehicle can provide an electric charge to the host vehicle 10, the communication can also specify, e.g., a present location of the responding vehicle, a direction in which the responding vehicle is traveling, a current speed of the responding vehicle, a remaining charge level of the responding vehicle, etc.

In response to each communication received from the responding vehicles, the wireless communications system 50 can be further programmed to output a notification signal to the processor 56. The notification signal can include information relating to the responding vehicle's present location, direction, speed, remaining charge level, etc.

In response to the notification signals from the wireless communications system 50, the processor 56 can be programmed to assess the information relating to the responding vehicle vis-à-vis the present location, direction, speed, remaining charge level, etc., of the host vehicle 10. The processor 56 can be further programmed to determine a potential target vehicle from which to receive the electric charge based on the assessment.

When the processor 56 determines the potential target vehicle, the processor 56 can be programmed to output a notification signal to the wireless communications system 50 to further communicate with the potential target vehicle. The communication can include, for example, a time and location for the potential target vehicle and the host vehicle 10 to meet. The communication can further request confirmation from the potential target vehicle that is will do so.

If the wireless communications system 50 receives the confirmation from the potential target vehicle, the wireless communications system 50 can be programmed to output a notification signal to the processor 56 indicating receipt of the confirmation. In response, the processor 56 can be programmed to determine that the potential target vehicle is now the target vehicle 48, and command the autonomous mode controller 58 to drive the host vehicle 10 to meet the target vehicle 48 at the time and location communicated to the target vehicle 48 by the wireless communications system 50.

When the host vehicle 10 and the target vehicle 48 meet, the host vehicle 10 may be operating in the autonomous mode. As discussed above, the distance sensor 52 can be programmed to output distance detection signals to the autonomous mode controller 58 when one or more predetermined distances are detected, such as a distance between the host vehicle 10 and the target vehicle 48. In response, the autonomous mode controller 58 can be programmed to operate the host vehicle 10 in the autonomous mode to achieve and maintain the predetermined distance between the host vehicle 10 and the target vehicle 48.

The autonomous mode controller 58 compares actual distances between the host vehicle 10 and the target vehicle 48, e.g., the distance between the extendable arm 16 of the host vehicle 10 and the target vehicle 48, the distance between the induction mat 24 of the host vehicle 10 and the target vehicle 48, the distance between the induction mat 24 of the host vehicle 10 and the wireless electric transfer device 22 of the target vehicle 48, and increases or decreases the speed of the host vehicle 10 accordingly by, e.g., providing various control signals to the acceleration, braking, and steering subsystems of the host vehicle 10.

In addition, the host vehicle 10 and the target vehicle 48 can coordinate communications in case, e.g., they both attempt to adjust distance. For instance, the host vehicle 10 and the target vehicle 48 may agree that only the host vehicle 10 will adjust the distance, only a "rear" vehicle will adjust the distance, etc. Moreover, the host vehicle 10 and the target vehicle 48 may agree on a particular speed and lane for transmission of the electric field unless, e.g., there is an obstruction.

When the autonomous mode controller 58 is maintaining the predetermined distance between the host vehicle 10 and the target vehicle 48, the autonomous mode controller 58 may be programmed to output a notification signal to the wireless communications system 50. In response, the wireless communications system 50 can be programmed to send a communication to the target vehicle 48 confirming that the host vehicle 10 is ready to receive the electric charge, and requesting confirmation from the target vehicle 48 that the target vehicle 48 is ready to transmit the electric charge.

When the target vehicle 48 sends a communication to the host vehicle 10 that the target vehicle 48 is ready to transmit the electric charge, the wireless communications system 50 can be programmed to output a notification signal to the processor 56 confirming that the target vehicle 48 is ready to transmit the electric charge.

In response to the notification signal, the processor 56 can be programmed to output a control signal to the actuator 46 to extend the extendable arm 16, and to close the switch 36 to the first position, as shown in FIG. 6B. At this point, the target vehicle 48 can begin transmitting the electric charge to the host vehicle 10.

As discussed above, the processor 56 can be programmed to monitor the charge level of the electrical storage device 14 while charging. Once the processor 56 determines the charge level of the electric storage device 14 is sufficient, for example, for the host vehicle 10 to reach the destination, the processor 56 can be programmed to output a control signal to the actuator 46 to retract the extendable arm 16.

In addition, the processor 56 can be further programmed to output a notification signal to the wireless communications system 50 that the charging is completed. In response, the wireless communications system 50 can be programmed to send a communication to the target vehicle 48 that the charging is complete.

The vehicle charging system 12 of the host vehicle 10 can also be configured to transfer an electric charge to another vehicle.

For example, the wireless communications system 50 of the host vehicle 10 may be programmed to receive communications from other vehicles indicating that another vehicle needs an electric charge. The communications can further identify a present location of the other vehicle, a direction in which the other vehicle is traveling, a current speed of the other vehicle, the charge level of the other vehicle, etc.

In response, the wireless communications system 50 can be programmed to output a notification signal to the processor 56. The notification signal can include information relating to a requesting vehicle's present location, direction, speed, remaining charge level, etc.

In response to the notification signal, the processor 56 can be programmed to assess the information relating to the requesting vehicle vis-à-vis a present location, direction, speed, remaining charge level, etc., of the host vehicle 10, and determine whether the electrical storage device 14 has sufficient electric charge to transfer the electric charge to the other vehicle. If the processor 56 determines that is does, the processor 56 can be programmed to output a notification signal to the wireless communications system 50.

In response to the notification signal from the processor 56, the wireless communications system 50 can be programmed to further communicate with the requesting vehicle. The communication can include, e.g., a time and location for the requesting vehicle and the host vehicle 10 to meet, and requesting confirmation from the requesting vehicle that is will do so.

The wireless communications system 50 is programmed to output a notification signal to the processor 56 indicating receipt of the confirmation if the wireless communications system 50. In response, the processor 56 can be programmed to determine that the requesting vehicle is a target vehicle 48, and command the autonomous mode controller 58 to drive the host vehicle 10 to meet the target vehicle 48 at the time and location communicated.

When the host vehicle 10 and the target vehicle 48 meet, the host vehicle 10 is operating in the autonomous mode. As discussed above, the distance sensor 52 can be programmed to output distance detection signals to the autonomous mode controller 58 when one or more predetermined distances are detected, such as a distance between the host vehicle 10 and the target vehicle 48. In response, the autonomous mode controller 58 can be programmed to operate the host vehicle 10 in the autonomous mode to achieve and maintain the predetermined distance between the host vehicle 10 and the target vehicle 48.

The autonomous mode controller 58 compares actual distances between the host vehicle 10 and the target vehicle 48, e.g., the distance between the extendable arm 16 of the host vehicle 10 and the target vehicle 48, the distance between the induction mat 24 of the host vehicle 10 and the target vehicle 48, the distance between the induction mat 24 of the host vehicle 10 and the wireless electric transfer device 22 of the target vehicle 48, and increases or decreases the speed of the host vehicle 10 accordingly by, e.g., providing various control signals to the acceleration, braking, and steering subsystems of the host vehicle 10.

In addition, the host vehicle 10 and the target vehicle 48 can coordinate communications in case, e.g., they both attempt to adjust distance. For instance, the host vehicle 10 and the target vehicle 48 may agree that only the host vehicle 10 will adjust the distance, only a "rear" vehicle will adjust the distance, etc. Moreover, the host vehicle 10 and the target vehicle 48 may agree on a particular speed and lane for transmission of the electric field unless, e.g., there is an obstruction.

When the autonomous mode controller 58 is maintaining the predetermined distance between the host vehicle 10 and the target vehicle 48, the autonomous mode controller 58 may be programmed to output a notification signal to the wireless communications system 50. In response, the wireless communications system 50 can be programmed to send a communication to the target vehicle 48 confirming that the host vehicle 10 is ready to transmit the electric charge, and requesting confirmation from the target vehicle 48 that the target vehicle 48 is ready to receive the electric charge.

When the target vehicle 48 sends a communication to the host vehicle 10 that the target vehicle 48 is ready to receive the electric charge, the wireless communications system 50 can be programmed to output a notification signal to the processor 56 confirming that the target vehicle 48 is ready to receive the electric charge.

In response to the notification signal, processor 56 can be programmed to output a control signal to the actuator 46 to extend the extendable arm 16, and to close the switch 36 to the second position, as shown in FIG. 6A. At this point, the host vehicle 10 can begin transmitting the electric charge to the target vehicle 48.

When it is determined that the transmission of the electric charge is complete, the processor 56 can be programmed to output a control signal to the actuator 46 to retract the extendable arm 16.

FIGS. 6A and 6B illustrate circuit diagrams. The circuit diagrams include the electrical storage device 14, the induction coil 26, the first electric lead 28, the second electric lead 30, the rectifier 32, the inverter 34, and the switch 36.

In FIG. 6A, the switch 36 is electrically connected to the second electric lead 30. When the induction coil 26 is transmitting an electric charge to, e.g., the target vehicle 48, the inverter 34 converts the electric charge from the electrical storage device 14 from a direct current to an alternating current. In this way, the induction coil 26 can transmit the electric charge to the target vehicle.

In FIG. 6B, the switch 36 is electrically connected to the first electric lead 28. When the induction coil 26 is receiving an electric charge from, e.g., the target vehicle 48, the rectifier 32 converts an alternating current to a direct current. In this way, the electric charge received by the induction coil 26 from the target vehicle 48 can be stored in the electrical storage device 14.

Figure 7:
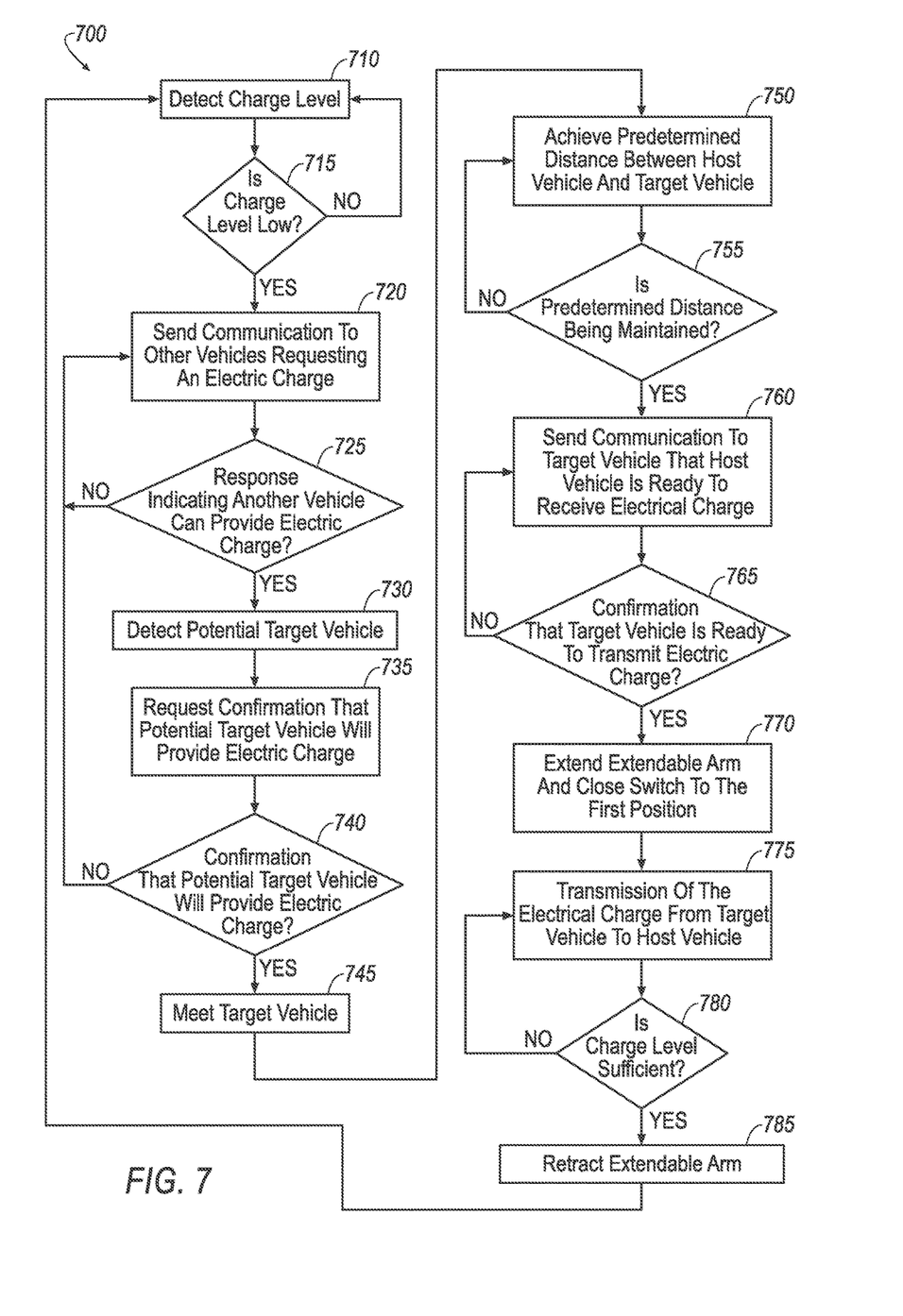
FIG. 7 is a flowchart of an example process that may be executed by the vehicle charging system.

FIG. 7 is a flowchart of an example process 700 that may be executed by the vehicle charging system 12. The process 700 may begin when the host vehicle 10 is started. The process 700 may continue to execute until the host vehicle 10 is turned off.

The example process 700 does not include determining weather. It should be understood, however, that the weather could be assessed and accounted for during the course of the process 700. For example, the host vehicle 10 could include rain sensors. Alternatively or additionally, the wireless communications system 50 could be programmed to receive communications relating to the weather.

At block 710, the vehicle charging system 12 detects the charge level of the electrical storage device 14. The charge level indicates a range of operation of the host vehicle 10. As discussed above, the processor 56 is programmed to monitor the charge level of the electrical storage device 14. Following detection of the charge level of the electrical storage device 14 by the processor 56, the process 700 proceeds to decision block 715.

At decision block 715, the vehicle charging system 12 determines whether the charge level is low. The processor 56 is programmed to determine the range of operation of the host vehicle 10 based on the charge level of the electrical storage device 14. The processor 56 is further programmed to determine whether the range of operation of the host vehicle is less than a distance the host vehicle 10 will travel to reach a destination. If the processor 56 determines that the electrical storage device has a sufficient charge level to reach the destination, the process 700 returns to block 710. If the processor 56 determines that the electrical storage device 14 does not have a sufficient charge level to reach the destination, the process 700 proceeds to block 720.

At block 720, the vehicle charging system 12 is programmed to send a communication to other vehicles requesting an electric charge. As discussed above, when the processor 56 determines that the charge level of the host vehicle 10 is low, the processor 56 is programmed to output a notification signal to the wireless communications system 50. In response the notification signal, the wireless communications system 50 is programmed to send a communication to other vehicles. The communication identifies the present location, direction, speed and charge level of the host vehicle 10, and requests that the other vehicles provide an electric charge to the host vehicle 10. Once the communication is sent, the process 700 proceeds to decision block 725.

At decision block 725, the vehicle charging system 12 determines whether a vehicle has responded to the communication requesting the electric charge. Specifically, the wireless communications system 50 can receive communications from other vehicles, as discussed above. The communications from the responding vehicles can specify, for example, a present location of the responding vehicle, a direction in which the responding vehicle is traveling, a current speed of the responding vehicle, a remaining charge level of the responding vehicle, and that the responding vehicle can provide the host vehicle 10 with an electric charge. In response to each of the communications received from the responding vehicles, the wireless communications system 50 is programmed to output a notification signal to the processor 56. The notification signal includes information relating to the responding vehicle's present location, direction, speed, remaining charge level, etc. If the processor 56 does not receive the notification signal from the wireless communications system 50, the process 700 returns to block 720. If the processor 56 receives the notification signal from the wireless communications system 50, the process 700 proceeds to block 730.

At block 730, the vehicle charging system 12 is programmed to detect a potential target vehicle. In response to the notification signals from the wireless communications system 50, the processor 56 is programmed to assess the information relating to the responding vehicle vis-à-vis the present location, direction, speed, remaining charge level, etc., of the host vehicle 10. The processor 56 is further programmed to determine a potential target vehicle from which to receive the electric charge based on the assessment. Once the potential target vehicle has been detected, the process 700 proceeds to block 735.

At block 735, the vehicle charging system 12 is programmed to request confirmation from the potential target vehicle that the potential target vehicle will provide the host vehicle 10 the electric charge. Specifically, the processor 56 is programmed to output a notification signal to the wireless communications system 50 to further communicate with the potential target vehicle. The communication requests confirmation from the potential target vehicle that is will provide the host vehicle 10 with the electric charge, and includes a time and location for the potential target vehicle and the host vehicle 10 to meet. Once the communication to the potential target vehicle has been sent, the process 700 proceeds to decision block 740.

At decision block 740, the vehicle charging system 12 determines whether the potential target vehicle has responded to the communication requesting confirmation that the potential target vehicle will provide the host vehicle 10 the electric charge at the time and location specified. When the wireless communications system 50 receives the confirmation from the potential target vehicle, the wireless communications system 50 is programmed to output a notification signal to the processor 56 indicating receipt of the confirmation. In response, the processor 56 is programmed to determine that the potential target vehicle is now the target vehicle 48, and to command the autonomous mode controller 58 to drive the host vehicle 10 to meet the target vehicle 48 at the time and location communicated. If the processor 56 does not receive the notification signal from the wireless communications system 50 of receipt of the confirmation from the potential target vehicle, the process 700 returns to block 720. If the processor 56 receives the notification signal from the wireless communications system 50, the process 700 proceeds to block 745.

At block 745, the vehicle charging system 12 is programmed to meet the target vehicle 48. Specifically, the processor 56 commands the autonomous mode controller 58 to drive the host vehicle 10 to meet the target vehicle 48 at the specified time and location. Once the host vehicle 10 and the target vehicle meet, the process 700 proceeds to block 750.

At block 750, the vehicle charging system 12 is programmed to achieve a predetermined distance between the host vehicle 10 and the target vehicle 48. As discussed above, the distance sensor 52 is programmed to output distance detection signals to the autonomous mode controller 58 when one or more predetermined distances are detected, e.g., a distance between the host vehicle 10 and the target vehicle 48. The autonomous mode controller 58 is programmed to operate the host vehicle 10 to receive a distance detection signal from the distance sensor 52 indicating that the predetermined distance between the host vehicle 10 and the target vehicle 48 has been achieved. Once the predetermined distance between the host vehicle 10 and the target vehicle 48 has been achieved, the process 700 proceeds to decision block 755.

At decision block 755, the vehicle charging system 12 determines whether the predetermined distance between the host vehicle 10 and the target vehicle 48 is maintained. The autonomous mode controller 58 is programmed to maintain the predetermined distance between the host vehicle 10 and the target vehicle 48. If the distance sensor 52 detects that the predetermined distance between the host vehicle 10 and the target vehicle 48 is not maintained, i.e., the distance sensor 52 stops outputting the distance detection signal to the autonomous mode controller 58 indicating that the host vehicle 10 and the target vehicle 48 are at the predetermined distance, the process 700 returns to block 750. If the host vehicle 10 and the target vehicle 48 are maintaining the predetermined distance, the process proceeds to block 760.

At block 760, the vehicle charging system 12 is programmed to send a communication to the target vehicle 48 that the host vehicle 10 is ready to receive the electric charge. The autonomous mode controller 58 is programmed to output a notification signal to the wireless communications system 50 when the predetermined distance between the host vehicle 10 and the target vehicle 48 is maintained. In response to the notification signal, the wireless communications system 50 is programmed to send a communication to the target vehicle 48 confirming that the host vehicle 10 is ready to receive the electric charge, and requesting confirmation that the target vehicle 48 is ready to transmit the electric charge. Once the communication to the target vehicle 48 has been sent, the process 700 proceeds to decision block 765.

At decision block 765, the vehicle charging system 12 determines whether the target vehicle 48 has confirmed that the target vehicle 48 is ready to transmit the electric charge to the host vehicle 10. When the target vehicle 48 sends a communication to the host vehicle 10 that it is ready to transmit the electric charge to the host vehicle 10, the wireless communications system 50 is programmed to send a notification signal to the processor 56. If the processor 56 does not receive the notification signal within a period of time, the process 700 returns to block 760. If the processor 56 receives the notification signal, the process 700 proceeds to block 770.

At block 770, the vehicle charging system 12 is programmed to extend the extendable arm 16, and close the switch 36 to allow the electric charge transmitted by the target vehicle to be stored in the electrical storage device 14. That is, the processor 56 is programmed to receive the notification signal from the wireless communications system 50 that the target vehicle 48 confirmed it is ready to transmit the electric charge to the host vehicle 10. In response to the notification signal, the processor 56 is programmed to output a control signal to the actuator 46 to extend the extendable arm 16, and to close the switch 36 to the first position, as shown in FIG. 6B. Once the extendable arm 16 is extended and the switch 36 closed to the first position, the process 700 proceeds to block 775.

At block 775, the vehicle charging system 12 is programmed to receive the transmission of the electric charge from the target vehicle 48. Specifically, the target vehicle 48 wirelessly transmits the electric charge to the host vehicle 10. While the target vehicle 48 is wirelessly transmitting the electric charge to the host vehicle 10, the process 700 proceeds to decision block 780.

At decision block 780, the vehicle charging system 12 determines whether the charge level of the host vehicle 10 is sufficient. As discussed above, the processor 56 is programmed to monitor the charge level of the electrical storage device 14. The processor 56 is further programmed to determine the range of operation of the host vehicle 10 based on the charge level of the electrical storage device 14, and whether the range of operation of the host vehicle is less than a distance the host vehicle 10 will travel to reach a destination. If the processor 56 determines that the electrical storage device 14 has an insufficient charge level to reach the destination, the process 700 returns to block 775. If the processor 56 determines that the electrical storage device 14 has a sufficient charge level to reach the destination, the process 700 proceed to block 785.

At block 785, the vehicle charging system 12 is programmed to retract the extendable arm 16. Specifically, the processor 56 is programmed to monitor the charge level of the electrical storage device 14. Once the processor 56 determines the charge level of the electrical storage device 14 is sufficient, for example, for the host vehicle 10 to reach the destination, the processor 56 is programmed to output a control signal to the actuator 46 to retract the extendable arm 16. Following block 785, the process 700 returns to block 710.

In general, the computing systems and/or devices described may employ any of a number of computer operating systems, including, but by not limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. One or more transmission media, including coaxial cables, copper wire and fiber optics, including the wires that comprise a system bus coupled to a processor of a computer, may transmit such instructions. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle charging system comprising:
an electrical storage device;
an extendable arm having a first end and a second end, the first end attachable to a host vehicle and the second end extendable in a direction away from the host vehicle to an extended position;
an induction mat supported at the second end of the extendable arm, wherein the induction mat is electrically coupled to the electrical storage device and configured to wirelessly receive an electric charge when the host vehicle is moving and the extendable arm is in the extended position; and
a processor programmed to receive a confirmation message from a second vehicle indicating that the second vehicle is ready to provide the electric charge to the host vehicle and command the extendable arm to extend toward the second vehicle as a result of receiving the confirmation message from the second vehicle.

2. The vehicle charging system of claim 1, wherein the induction mat includes at least one induction coil configured to wirelessly receive the electric charge.

3. The vehicle charging system of claim 1, wherein the vehicle charging system is configured to wirelessly receive the electric charge from the second vehicle when the host vehicle and the second vehicle are moving.

4. The vehicle charging system of claim 2, wherein the host vehicle wirelessly receives the electric charge from an induction mat located on the second vehicle.

5. The vehicle charging system of claim 4, wherein the host vehicle wirelessly receives the electric charge from the second vehicle when an extendable arm of the second vehicle is in the extended position.

6. The vehicle charging system of claim 1, wherein the electric charge is stored in the electrical storage device.

7. The vehicle charging system of claim 6, wherein the electrical storage device includes a battery.

8. The vehicle charging system of claim 1, wherein the induction mat is configured to wirelessly transmit an electric charge to a third vehicle when the host vehicle is moving.

9. The vehicle charging system of claim 8, wherein the induction mat includes at least one induction coil configured to wirelessly transmit the electric charge.

10. The vehicle charging system of claim 8, wherein the vehicle charging system is configured to wirelessly transmit the electric charge to the third vehicle when the host vehicle and the third vehicle are moving.

11. The vehicle charging system of claim 10, wherein the vehicle charging system is configured to wirelessly transmit the electric charge when the extendable arm is in an unextended position.

12. The vehicle charging system of claim 1, further comprising a wireless communications system.

13. The vehicle charging system of claim 12, wherein the wireless communications system is programmed to send communications to at least one other vehicle requesting that the at least one other vehicle provide the electric charge to the host vehicle.

14. The vehicle charging system of claim 12, wherein the wireless communications system is programmed to receive communications from at least one other vehicle indicating that the at least one other vehicle can provide the electric charge to the host vehicle.

15. The vehicle charging system of claim 1, further comprising at least one distance sensor.

16. The vehicle charging system of claim 15, wherein the processor is programmed to receive an output signal from the at least one distance sensor, and output a control signal to maintain a predetermined distance of the host vehicle relative to other vehicles when the host vehicle and the other vehicles are moving.

17. A vehicle system comprising:
- an extendable arm including a first end and a second end, the first end attachable to a host vehicle;
- an induction mat supported by the second end of the extendable arm and extendable in a direction away from the host vehicle, the induction mat configured to wirelessly receive an electric charge;
- a wireless communications system that wirelessly communicates with other vehicles;
- a processor programmed to command the wireless communication system to transmit a message to the other vehicles requesting an electric charge, to receive a confirmation message from one of the other vehicles confirming that one of the other vehicles is ready to provide the electric charge, to position the host vehicle near the other vehicle, to output a control signal to extend the extendable arm as a result of receiving the confirmation message confirming that one of the other vehicles is ready to provide the electric charge, and to send a message to the other vehicle confirming that the host vehicle is ready to receive the electric charge.

18. The vehicle system of claim 17, wherein the processor is programmed to control a distance between the host vehicle and the other vehicle when the host vehicle is receiving the electric charge.

19. The vehicle system of claim 17, wherein the processor is programmed to control a distance between the induction mat and a wireless electric transfer device of the other vehicle when the host vehicle is receiving the electric charge.

20. The vehicle system of claim 17, wherein the processor is programmed to output a control signal to retract the extendable arm when charging is complete.

* * * * *